United States Patent
Caro et al.

(10) Patent No.: US 11,536,208 B2
(45) Date of Patent: Dec. 27, 2022

(54) DEVICE FOR CONTROL OF A BUTTERFLY VALVE OF AN INTERNAL COMBUSTION ENGINE AND INTERNAL COMBUSTION ENGINE COMPRISING SAID DEVICE

(71) Applicant: FPT INDUSTRIAL S.P.A., Turin (IT)

(72) Inventors: Marcello Caro, Piossasco (IT); Bruno Aimar, Margarita (IT); Aldo Brucato, Orbassano (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 17/283,143

(22) PCT Filed: Oct. 17, 2019

(86) PCT No.: PCT/IB2019/058856
§ 371 (c)(1),
(2) Date: Apr. 6, 2021

(87) PCT Pub. No.: WO2020/079632
PCT Pub. Date: Apr. 23, 2020

(65) Prior Publication Data
US 2021/0340923 A1 Nov. 4, 2021

(30) Foreign Application Priority Data
Oct. 17, 2018 (IT) ........................ 102018000009528

(51) Int. Cl.
*F02D 41/00* (2006.01)
*F02D 9/10* (2006.01)
*F02D 11/10* (2006.01)

(52) U.S. Cl.
CPC ....... *F02D 41/0002* (2013.01); *F02D 9/1005* (2013.01); *F02D 11/105* (2013.01);
(Continued)

(58) Field of Classification Search
CPC ........... F02D 11/105; F02D 2200/0404; F02D 2200/0406; F02D 41/0002
See application file for complete search history.

(56) References Cited

U.S. PATENT DOCUMENTS 4,662,496 A   5/1987   Sakakiyama
4,765,296 A * 8/1988   Ishikawa ............... F02D 11/105
                                                    123/361
(Continued)

FOREIGN PATENT DOCUMENTS

CN      1800615 A      7/2006
CN    101240752 A      8/2008
(Continued)

OTHER PUBLICATIONS

Japanese Office Action in JP Application No. 2021-521163, dated Sep. 7, 2022 (an english translation is attached hereto) (7 pages).

*Primary Examiner* — John M Zaleskas
(74) *Attorney, Agent, or Firm* — Leason Ellis LLP

(57) ABSTRACT

A control method of a butterfly valve of an internal combustion engine, when said internal combustion engine is running, wherein said butterfly valve is controlled by means of a control signal, indicative of an angular position of said valve, the method comprising a step of applying a first limiting filter of a gradient of said control signal, when a ratio between a target pressure downstream of the butterfly valve and a measured pressure upstream of the butterfly valve is greater than a first predetermined threshold.

4 Claims, 2 Drawing Sheets

(52) U.S. Cl.
CPC .............. *F02D 2200/0404* (2013.01); *F02D 2200/0406* (2013.01); *F02D 2200/0414* (2013.01)

(56) References Cited

U.S. PATENT DOCUMENTS

| | | | |
|---|---|---|---|
| 4,999,781 A * | 3/1991 | Holl | F02D 41/0052 701/108 |
| 5,025,380 A | 6/1991 | Wataya et al. | |
| 5,595,159 A * | 1/1997 | Huber | F02D 11/105 123/362 |
| 5,758,621 A | 6/1998 | Suzuki et al. | |
| 6,418,907 B1 * | 7/2002 | Freeh | F02D 11/105 123/325 |
| 6,497,214 B2 | 12/2002 | Yagi | F02D 11/105 123/399 |
| 7,305,967 B1 * | 12/2007 | Hagari | F02M 35/10295 123/403 |
| 2004/0015287 A1 * | 1/2004 | Ilzuka | F02D 35/023 701/102 |
| 2005/0081823 A1 * | 4/2005 | Muto | F02D 41/18 123/350 |
| 2005/0240333 A1 * | 10/2005 | Bauerle | F02D 11/105 701/93 |
| 2006/0081216 A1 * | 4/2006 | Muto | F02D 35/0007 123/350 |
| 2006/0102144 A1 * | 5/2006 | Muto | F02D 41/32 123/399 |
| 2006/0276954 A1 * | 12/2006 | Muto | F02D 9/02 701/110 |
| 2007/0240680 A1 * | 10/2007 | Muto | F02D 13/023 123/396 |
| 2008/0120009 A1 * | 5/2008 | Livshiz | F02D 11/105 701/102 |
| 2009/0033264 A1 | 2/2009 | Falkenstein | |
| 2009/0118968 A1 * | 5/2009 | Livshiz | F02D 37/02 701/102 |
| 2009/0173314 A1 * | 7/2009 | Whitney | F02D 31/002 123/350 |
| 2010/0049419 A1 * | 2/2010 | Yoshikawa | F02D 35/0007 701/103 |
| 2010/0075803 A1 * | 3/2010 | Sharples | B60K 6/48 477/110 |
| 2010/0154741 A1 | 6/2010 | Arnett et al. | |
| 2011/0297124 A1 * | 12/2011 | Miyata | F02D 35/024 123/391 |
| 2013/0104843 A1 * | 5/2013 | Crombe | F02D 13/0261 123/349 |
| 2013/0304355 A1 * | 11/2013 | Takahashi | F02D 41/0002 701/103 |
| 2014/0123938 A1 * | 5/2014 | Whitney | F02D 41/0002 123/319 |
| 2014/0182288 A1 * | 7/2014 | Stellwagen | F02B 69/04 60/611 |
| 2016/0131061 A1 * | 5/2016 | Whitney | F02D 41/0077 701/108 |
| 2016/0290254 A1 * | 10/2016 | Nozaki | F02M 26/49 |
| 2017/0016402 A1 * | 1/2017 | Myung | F02D 41/123 |
| 2017/0114736 A1 * | 4/2017 | Iida | F02D 41/0005 |
| 2018/0258872 A1 * | 9/2018 | Agata | F02D 41/005 |
| 2018/0363566 A1 * | 12/2018 | Banker | F02D 17/02 |
| 2019/0003399 A1 * | 1/2019 | Kim | F02B 37/18 |
| 2019/0285009 A1 * | 9/2019 | Wanibe | F02D 41/0002 |
| 2020/0132002 A1 * | 4/2020 | Wanibe | F02D 9/02 |
| 2020/0200100 A1 * | 6/2020 | Shi | F02M 26/06 |
| 2020/0208584 A1 * | 7/2020 | Maekawa | F01N 9/00 |
| 2021/0087992 A1 * | 3/2021 | Iihoshi | F02D 11/105 |

FOREIGN PATENT DOCUMENTS

| | | |
|---|---|---|
| CN | 107035970 A | 8/2017 |
| JP | S61 171846 | 8/1986 |
| JP | 1996296507 A | 11/1996 |
| JP | 2006132498 A * | 5/2006 |
| JP | 2006132499 A | 5/2006 |
| JP | 2006274993 A * | 10/2006 |
| JP | 5 204894 | 6/2013 |
| JP | 2014190173 A * | 10/2014 |
| JP | 2016217176 A * | 12/2016 |
| WO | 2012105010 A1 | 8/2012 |

* cited by examiner

DEVICE FOR CONTROL OF A BUTTERFLY VALVE OF AN INTERNAL COMBUSTION ENGINE AND INTERNAL COMBUSTION ENGINE COMPRISING SAID DEVICE

CROSS-REFERENCE TO RELATED APPLICATIONS

This patent application is a U.S. National Phase Application under 35 U.S.C. § 371 of International Patent Application No. PCT/IB2019/058856, filed on Oct. 17, 2019, which claims priority from Italian patent application no. 102018000009528 filed on Oct. 17, 2018, all of which are incorporated by reference, as if expressly set forth in their respective entireties herein.

TECHNICAL FIELD OF THE INVENTION

The invention relates to the field of engine control and, in particular, to a device to control a butterfly valve of an internal combustion engine and to an internal combustion engine comprising said device.

STATE OF THE ART

Spark ignition internal combustion engines are provided with a butterfly valve in the intake duct, which allows for a chocking of the filling of the cylinders of the engine.

The butterfly usually is a thin plate with a circular or elliptical shape and is hinged to the intake duct of the engine by means of a shaft extending through a symmetry axis of its shape.

A rotation of the plate around said shaft allows for an adjustment of the air flow rate flowing into the internal combustion engine.

Given a fixed number of revolutions per minute of the internal combustion engine, a variation in the flow of air in relation to an angular position of the valve is strongly non-linear, depending on the angular position of the plate of the valve.

For example, when the valve is almost completely closed, small angular variations in the valve lead to great variations in the air flow.

Vice versa, when the valve is almost completely open, small angular variations in the valve lead to small variations in the air flow.

Since, in a spark ignition engine, great variations in the air flow correspond to significant torque changes, this means that the variation in the angular position of the plate of the butterfly valve needs to be properly controlled in order to obtain an adequate torque delivery.

When the vehicle is provided with an automatic transmission, the gear shifts are taken into account in the management of the torque delivered; therefore, with the gear shift, the following steps are carried out in succession:
  uncoupling of the engine from the transmission, through the opening of the clutch,
  setting of the engine to a zero delivered torque value at a desired number of revolutions,
  gear shift,
  coupling of the engine to the transmission, through the closing of the clutch,
  delivering of torque by the engine.

When the engine is brought to a zero delivered torque value, the valve can close up to the minimum opening.

By zero delivered torque we mean the torque that allows the engine to remain at a desired number of revolutions per minute without delivery of useful torque, since the torque produced in the cylinders during the combustion serves the sole purpose of overcoming inner frictions on the inside of the engine.

Vice versa, when the engine delivers a predetermined torque, the valve opens up to a position corresponding to the necessary air flow.

Therefore, in order to reach a predetermined objective torque "Coppia_Obj", an objective air mass "Massa_aria_Obj" is needed according to the following equation (1):

$$\text{Coppia\_Obj} = K \cdot \text{Massa\_aria\_Obj} \tag{1}$$

In order to obtain the Massa_aria_Obj, the air flow taken into the engine must be adjusted. This flow is adjusted through the butterfly valve.

The butterfly valve closing and opening operations lead to significant changes in the delivery of torque, especially in relation to the specific delivery features of the engine and to the response of a possible turbocharger device.

These changes in the delivery of torque can cause tugs during the gear shift, in the clutch closing phase. These tugs can damage the automatic transmission.

A manual transmission can be damaged as well, in case of excess torque delivered by the internal combustion engine.

SUMMARY OF THE INVENTION

The object of the invention is to solve the aforesaid tug problem during gear shifts, though without jeopardizing the general performances of the vehicle.

The idea on which the invention is based is that of reducing the application of the limiter of the gradient of the position of the butterfly valve only in the work points in which the changes in the torque delivered become too sudden, due to the non-linear characteristic of the butterfly valve actuator and to the typical delays of the system due to the capacitive effect of the intake manifold. According to the invention, the limiter is applied when a ratio between a target pressure downstream of the butterfly valve and a measured pressure upstream of the butterfly valve exceeds a predetermined threshold.

This ratio tends to a unitary value when the valve is completely open, whereas it decreases up to a so-called leakage value, namely when the valve is completely closed.

Preferably, the aforesaid strategy is implemented only when the valve is opening-controlled, namely limiting the opening speed of the butterfly valve above the aforesaid ratio.

According to a preferred variant of the invention implemented when the valve is closing-controlled, a limitation below the negative gradient is applied at least when the aforesaid pressure ratio is smaller than a second predetermined threshold and for butterfly positions close to the complete closing (alpha=0°). In other words, even in this case, the moving speed of the butterfly valve is limited when it is close to the complete closing.

This means that, at least in the final stages of the closing of the valve, its movement is slowed down so as to avoid a mechanical hit at the end of the travel.

Advantageously, since the limitation only intervenes for butterfly positions close to the complete closing, a quickly close of the butterfly valve can be guaranteed, such that a desired quick engine brake is achieved, at the same time without the risk of damaging or wearing the butterfly valve.

It should be pointed out that the gradient limiter applied to the opening of the butterfly valve is different from the limiter applied to the closing thereof.

Indeed, while in the first case peaks of delivered torque are avoided (limitation above a positive gradient), in the second case the damaging of the butterfly valve is avoided (limitation below a negative gradient).

In case of opening of the butterfly valve to obtain a positive gradient of the delivered torque, said predetermined value of the pressure ratio identifies a condition of transition between a sonic speed and a subsonic speed of the air flow flowing through the butterfly valve.

The object of the invention is a control device of a butterfly valve of an internal combustion engine according to claim 1.

Also a control method of a butterfly valve of an internal combustion engine forms the object of the invention.

A further object of the invention is an internal combustion engine comprising said device.

The claims describe preferred embodiments of the invention, thus forming an integral part of the description.

BRIEF DESCRIPTION OF THE FIGURES

Further purposes and advantages of the invention will be best understood upon perusal of the following detailed description of an embodiment thereof (and of relative variants) with reference to the accompanying drawings merely showing non-limiting examples, wherein.

In the figures, the same numbers and the same reference letters indicate the same elements or components.

Within the present description, the term "second" component does not imply the presence of a "first" component. As a matter of fact, these terms are only used for the sake of clarity and should not be interpreted in a limiting manner.

DETAILED DESCRIPTION OF EMBODIMENTS

Figure 1:
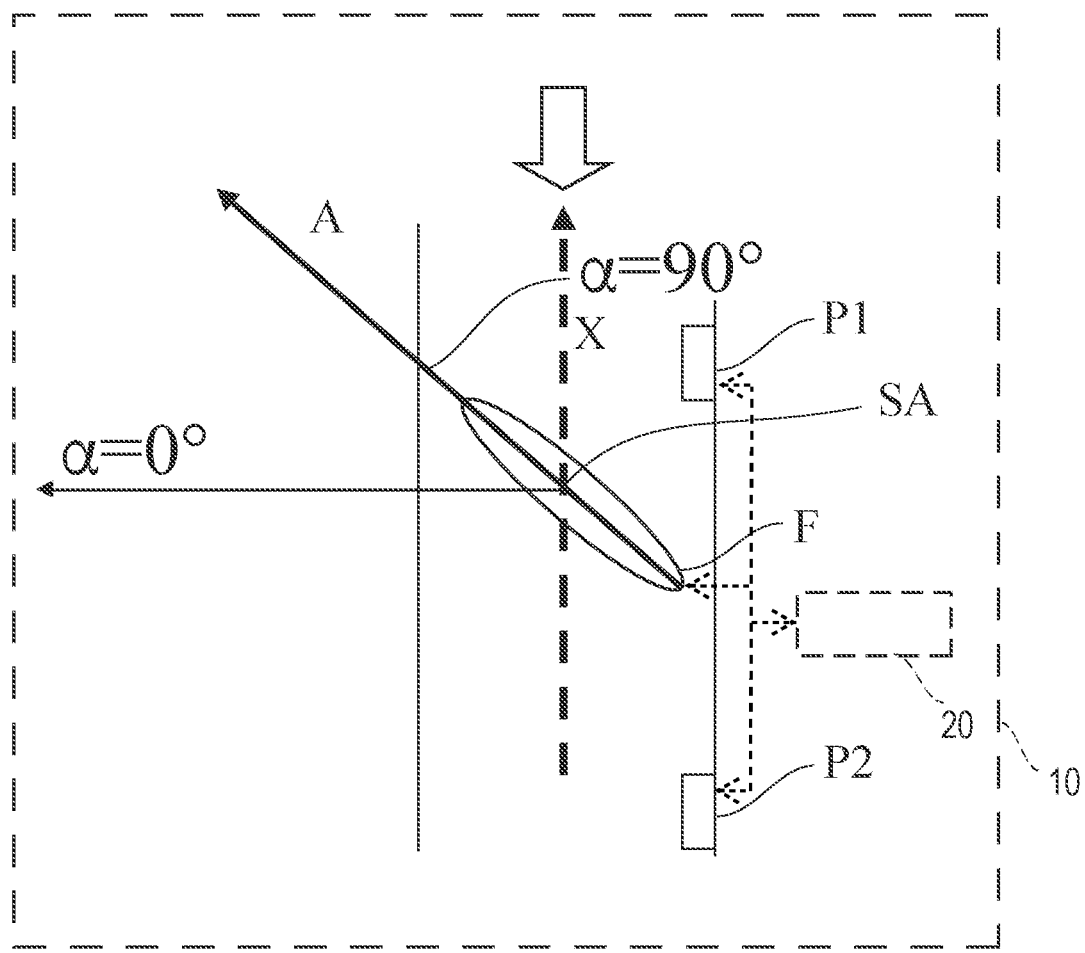
FIG. 1 schematically shows a butterfly valve of a spark ignition engine.

FIG. 1 schematically shows a butterfly valve F of an internal combustion engine inside the relative valve body, which has a tubular shape.

X indicates the axis of the valve body. On the other hand, A indicates an axis of the plate defining the valve.

The angle alpha corresponds to the angle between the axes A and X.

The air flow is indicated by the large arrow. Upstream of the valve F, according to the direction of the air flow, there is a first pressure sensor P1. Downstream of the valve there is a second pressure sensor P2.

Generally, a servo control (not shown herein) is associated to the valve F, the servo control being controlled according to an angular position alpha to be assumed by the valve relative to the axis X, which represents the position alpha. When alpha=90°, this corresponds to the complete opening of the butterfly valve. In this position, the air flow is not chocked and the engine expresses the maximum torque in relation to the specific operating point thereof. On the other hand, by zero torque delivery condition we mean a condition in which the fresh air flow flowing through the valve is the one strictly necessary to keep the engine at a predetermined speed, while it is disconnected from the drivetrain. Evidently, this condition does not require the valve to be completely closed, but this position represents a condition opposite to the one in which the valve is completely open with alpha=90°.

Generally, an angle sensor SA, which allows recognizing the angle alpha of the valve relative to X, is fitted onto the shaft of the valve.

The method being the object of the invention, which allows solving the aforesaid tug problem during the gear shift phase, is described hereinafter.

According to the invention, when the butterfly valve is opening-controlled to obtain an increase in the torque delivered by the internal combustion engine, a ratio between the target pressure Pressione_aria_Obj downstream of the butterfly valve and the pressure measured by the sensor P1, which is arranged upstream of the butterfly valve F, is calculated. When this ratio exceeds a predetermined threshold S1, a limiter of the position gradient of the valve is applied.

Such a limiter can be a saturator applied to the derivative of the control signal of the servo-mechanism controlling the position of the butterfly valve.

The target pressure can be represented with the following equation (2):

$$\text{Pressione\_aria\_Obj} = f(\text{Massa\_aria\_Obj}, \text{Temp\_aria\_Mis}, \text{Speed\_Mis}) \qquad (2)$$

The symbol "f", as it is known, derives from the Saint Venant equation and indicates a mathematical function known to a person skilled in the art, who is used to dealing with models of internal combustion engines.

The Massa_aria_Obj evidently is a function of the objective torque Coppia_Obj; therefore, relationship (2) represents an equation with one single unknown value, which is Pressione_aria_Obj and can be recast as follows:

$$\text{Pressione\_aria\_Obj} = f(\text{Coppia\_Obj}, \text{Temp\_aria\_Mis}, \text{Speed\_Mis}) \qquad (3)$$

Therefore, once the target torque has been acquired, for example acquiring a position of the accelerator pedal, the target air pressure can be calculated by means of the aforesaid equation.

The ratio of the aforesaid pressures typically ranges from 0.5 to 1, wherein 1 is obtained with the valve completely open and in running conditions.

For example, the limiter inhibits the servo-control from opening the butterfly valve for more than 2 degrees every 10 milliseconds.

The limiter is preferably applied to the sole opening of the valve and only when the aforesaid pressure ratio exceeds the aforesaid threshold S1.

As it can be understood from equation (2), the intervals of angular positions in which the limiter is applied also depend on the speed of rotation of the engine Speed_Mis, besides depending on the measured air temperature.

Generally, the temperature of the air flowing into the internal combustion engine is measured by means of a sensor which is built-in in the mass-air measurer arranged between the air filter and the butterfly valve. Nevertheless, other suitable collocations can be identified, especially if the internal combustion engine is supercharged. In this case, for example, the temperature sensor can preferably be installed downstream of the intercooler, which, as it is known, is arranged between the compressor and the butterfly valve.

Even though there is the pressure sensor P2 downstream of the butterfly valve, it is not preferably used to determine the application of the position gradient limiter.

Figure 2:
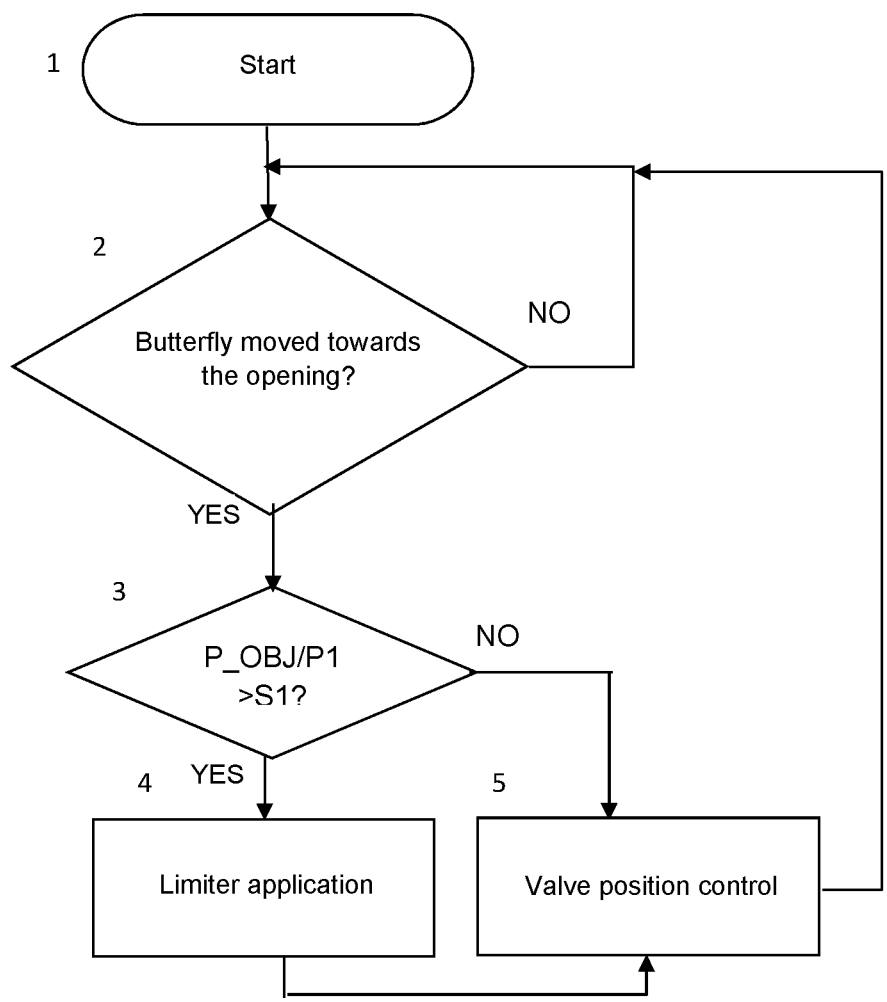
FIG. 2 schematically shows a flowchart according to a preferred variant of the invention.

FIG. 2 shows a flowchart implementing a preferred embodiment of the invention operated as long as the internal combustion is turned on.

In step
(Step 1) Start of the control
(Step 2) Checking whether there is a positive variation (opening) in the signal controlling the position of the butterfly valve, in case of a positive answer (Step 2=YES)
(Step 3) checking whether the ratio P_OBJ/P1 corresponding to the ratio between the target pressure Pressione_aria_Obj (P_OBJ) and said measured pressure upstream of the butterfly valve exceeds a first predetermined threshold S1, whereas, in case of a negative answer (Step 2=NO), the procedure restarts from the beginning (step 1)
(Step 4) If said ratio P_OBJ/P1>S1 (Step 3=YES), then a first limiter of the position gradient of the butterfly valve is applied,
(Step 5) otherwise, if, instead, said ratio P_OBJ/P1<=S1 (Step 3=NO), then no position gradient limiter is applied, or a second, more permissive limiter is applied, namely a gradient that allows for quicker movements of the butterfly valve compared to when said first limiter is applied.

According to a preferred variant of the invention, when the torque requested to the internal combustion engine is drastically reduced, the gradient limiter can be applied for butterfly positions close to the closing and when the aforesaid ratio P_OBJ/P1<S2, S2 being a second threshold, which is different from or equal to the first threshold S1. The butterfly position close to the closing can be chosen so as to avoid damaging of t by violently hitting a relative limit stop.

The position gradient limiter can be activated, when the valve is closing-controlled based on the angular position of the plate of the butterfly valve, also independently of the aforesaid pressure ratio.

For example, if in some conditions the aforesaid ratio is smaller than S2 at a 20° opening, the limiter can be activated when the plate reaches a 10° opening until a complete closing (alpha=0°).

This invention can advantageously be implemented in the processing unit controlling the engine (ECU) and, hence, it can be carried out by, means of a computer program comprising encoding means for carrying out one or more steps of the method, when the program is run on a computer. Therefore, the scope of protection is extended to said computer program and, furthermore, to computer readable means comprising a recorded message, said computer readable means comprising program encoding means for carrying out one or more steps of the method, when the program is run on a computer. In FIG. 1, the internal combustion engine is depicted by the box labeled 10 and the ECU is represented by the box labeled 20.

According to the invention, the expressions "upstream" and "downstream" relate to the direction of circulation of the fresh air through the butterfly valve when the internal combustion engine is turned on and regulated by the butterfly valve.

The non-limiting example described above can be subjected to variations, without for this reason going beyond the scope of protection of the invention, comprising all equivalent embodiments for a person skilled in the art.

When reading the description above, a skilled person can carry out the subject-matter of the invention without introducing further manufacturing details. The elements and features contained in the different preferred embodiments, drawings included, can be combined with one another, without for this reason going beyond the scope of protection of this patent application. The information contained in the part concerning the state of art only serves the purpose of better understanding the invention and does not represent a declaration of existence of the items described. Furthermore, if not specifically excluded by the detailed description, the information contained in the part concerning the state of art should be considered as an integral part of the invention.

The invention claimed is:

1. An electronic control unit (ECU) for controlling a butterfly valve of an internal combustion engine, wherein the electronic control unit is configured to:
send a control signal to rotate said butterfly valve so as to open and close a suction duct, the control signal being indicative of an angular position of said butterfly valve;
receive a pressure measured upstream of the butterfly valve in said suction duct;
calculate a ratio between a target pressure downstream of the butterfly valve and the measured pressure;
perform a check of whether said calculated ratio is greater than a first predetermined threshold;
limit a gradient for rotating said butterfly valve in said control signal to a first predetermined maximum when said check is positive; and
apply no limitation or a second predetermined maximum to said gradient when said check is negative,
wherein said second predetermined maximum is greater than the first predetermined maximum.

2. The electronic control unit according to claim 1, wherein the electronic control unit is further configured to:
determine whether said control signal is for an opening movement of said butterfly valve, wherein the limiting of the gradient for the rotating of said butterfly valve in said control signal to the first predetermined maximum is performed only if said determining is positive when said check is positive.

3. The electronic control unit according to claim 2, wherein the electronic control unit is configured to:
compare said calculated ratio to a second predetermined threshold to determine whether said calculated ratio is less than the second predetermined threshold;
determine an angle of opening for the butterfly valve; and
apply another limiter to the gradient for the rotating of said butterfly valve in said control signal based on one or more of said calculated ratio being determined to be less than the second predetermined threshold and the determined angle of opening for the butterfly valve reaching a predetermined value.

4. The electronic control unit according to claim 3, comprising a saturator for a derivative of said control signal.

* * * * *